United States Patent [19]

Yamada et al.

[11] Patent Number: 5,206,745
[45] Date of Patent: Apr. 27, 1993

[54] IMAGE READING DEVICE

[75] Inventors: Hiroyuki Yamada; Toshihiro Kumano; Yuji Ishii, all of Chiisagata; Shiro Takamizawa, Saku; Masanori Sato, Chiisagata, all of Japan

[73] Assignee: Matsushita Graphic Communication Systems, Inc., Tokyo, Japan

[21] Appl. No.: 626,287

[22] Filed: Dec. 12, 1990

[30] Foreign Application Priority Data

Dec. 29, 1989 [JP] Japan .................................. 1-340741

[51] Int. Cl.⁵ .............................................. H04N 1/04
[52] U.S. Cl. ..................................... 358/498; 358/496; 271/273; 271/274
[58] Field of Search ............... 358/496, 498, 482, 476, 358/472; 379/100; 271/273, 274, 162

[56] References Cited

U.S. PATENT DOCUMENTS

| | | | |
|---|---|---|---|
| 4,872,061 | 10/1989 | Uchiyama | 358/400 |
| 4,903,076 | 2/1990 | Sakakibara | 355/200 |
| 4,969,048 | 11/1990 | Hoshino | 358/296 |
| 4,996,606 | 2/1991 | Kawai et al. | 358/475 |

Primary Examiner—Edward L. Coles, Sr.
Assistant Examiner—Chi Lam
Attorney, Agent, or Firm—Wenderoth, Lind & Ponack

[57] ABSTRACT

An image reading device comprising a device body and an image sensor unit located near the bottom of the body and facing the path through which original documents are transported. The image sensor unit is retained by a retaining member rotatably mounted on a rotary fulcrum shaft located near the bottom of the body. Turning the retaining member around the shaft causes the image sensor unit to extend out of the device and be exposed to perform maintenance thereon.

9 Claims, 9 Drawing Sheets

IMAGE READING DEVICE

BACKGROUND OF THE INVENTION

1. Field of the Invention

The present invention relates to a device with capabilities for reading images from documents such as an image communication device or a copier (generically called an image reading device) and, more particularly, to an image reading device using a fixedly mounted contact-type image sensor to read images from documents being fed through the device.

2. Description of the Prior Art

The reading of images from original documents is conventionally accomplished by use of a contact-type image sensor unit integrally comprising a light source for lighting the surface of original documents against a base, a lens arrangement for forming the image reflected from the document surface, and an array of photoelectric transfer elements located in the image-forming position of the lens arrangement. In prior art image communication devices, this type of image sensor unit is fixedly located under the document transport path and faces the downside document surface (i.e. the downwardly facing surface of the document).

One disadvantage of the above-mentioned construction is the difficulty in maintaining the image sensor unit. Because the image sensor unit is incorporated in the central region of the device, cleaning, replacing or otherwise maintaining the unit requires disassembling the parts in the middle of the device, which takes time and effort.

BRIEF SUMMARY OF THE INVENTION

It is therefore an object of the present invention to provide an image reading device which allows the image sensor unit to be readily taken out thereof for cleaning, replacement or other maintenance purposes without the need to disassemble the parts in the middle thereof.

According to one aspect of the present invention, there is provided an image reading device having a contact-type image sensor unit rotatably mounted on a rotary fulcrum shaft located near the bottom of the device, the image sensor unit being rotated around the shaft so as to be readily removed from its fixed position in the device.

The contact-type image sensor unit is preferably mounted on a retaining member whose both ends constitute a fulcrum shaft. The device body has a means which forms mounting recesses comprising members for rotatably supporting the rotary fulcrum shaft and guide portions following the support members. The guide portions have one end thereof opened each. This allows the rotary fulcrum shaft to be removably mounted on the support members through the guide portions of the mounting recesses. Furthermore, the rotary fulcrum shaft has flat surfaces on both ends of its cylinder-shaped core, the surfaces being parallel with each another. The guide portions adjoining the support members of the mounting recesses are just large enough to let the thinned ends of the rotary fulcrum shaft pass therethrough. This prevents the rotary fulcrum shaft from getting inadvertently dislodged from the support members.

A cover member is swingingly mounted on the bottom of the device body near the position where the retaining member is located, the cover controlling the rotatable angle of the retaining member.

The retaining member has a latch mechanism. When the retaining member is closed (i.e. positioned so that the image sensor unit it retains occupies the predetermined reading position facing the document transport path), the latch mechanism keeps the retaining member in its closed position. If the retaining member is incompletely closed, the bottom of the latch mechanism protrudes above the putative line connecting the tips of a plurality of projections for supporting the device body at its bottom.

An injection pinch roller is movably retained by the retaining member which also has a spring arrangement for actuating the pinch roller and the latch mechanism.

The above and other related objects and features of the invention, as well as the novelty thereof, will clearly appear from the following description and from the accompanying drawings.

DETAILED DESCRIPTION OF PREFERRED EMBODIMENTS

Figure 9:
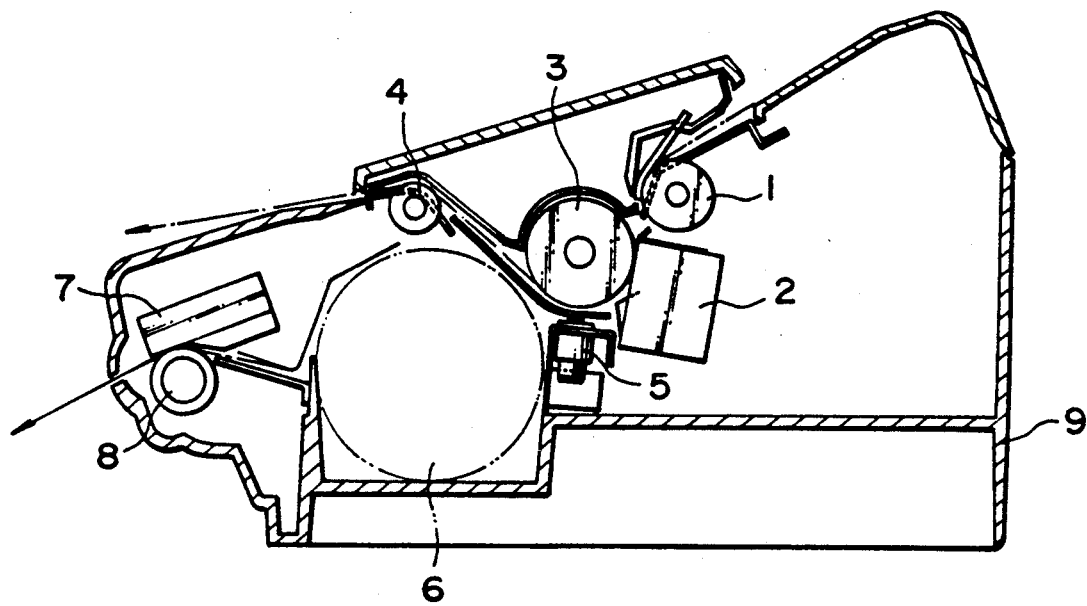
FIG. 9 is a schematic sectional view of a typical prior art image communication device.

Prior to describing the preferred embodiment of the invention, a typical prior art image communication device will be described with reference to FIG. 9. The image communication device has a body 9 for accommodating a transmitting section and a receiving section of the device. The transmitting section comprises a feed roller 1 for feeding each document, a contact-type image sensor unit 2 for reading the document, a reading roller 3 for transporting the document while pushing it against the contact-type image sensor unit 2, an ejection roller 4 for ejecting the document, and a stamp 5 for verifying the reading of the document. The receiving section comprises a recording paper roll 6, a thermal head 7 for printing data on the recording paper, and a platen roller 8 for transporting the recording paper while pushing it against the thermal head 7. The contact-type image sensor unit 2 and the stamp 5 are located in the central region of the body 9. Because of this construction, maintaining the image sensor unit 2 requires detaching other parts such as the reading roller 3.

Figure 1:
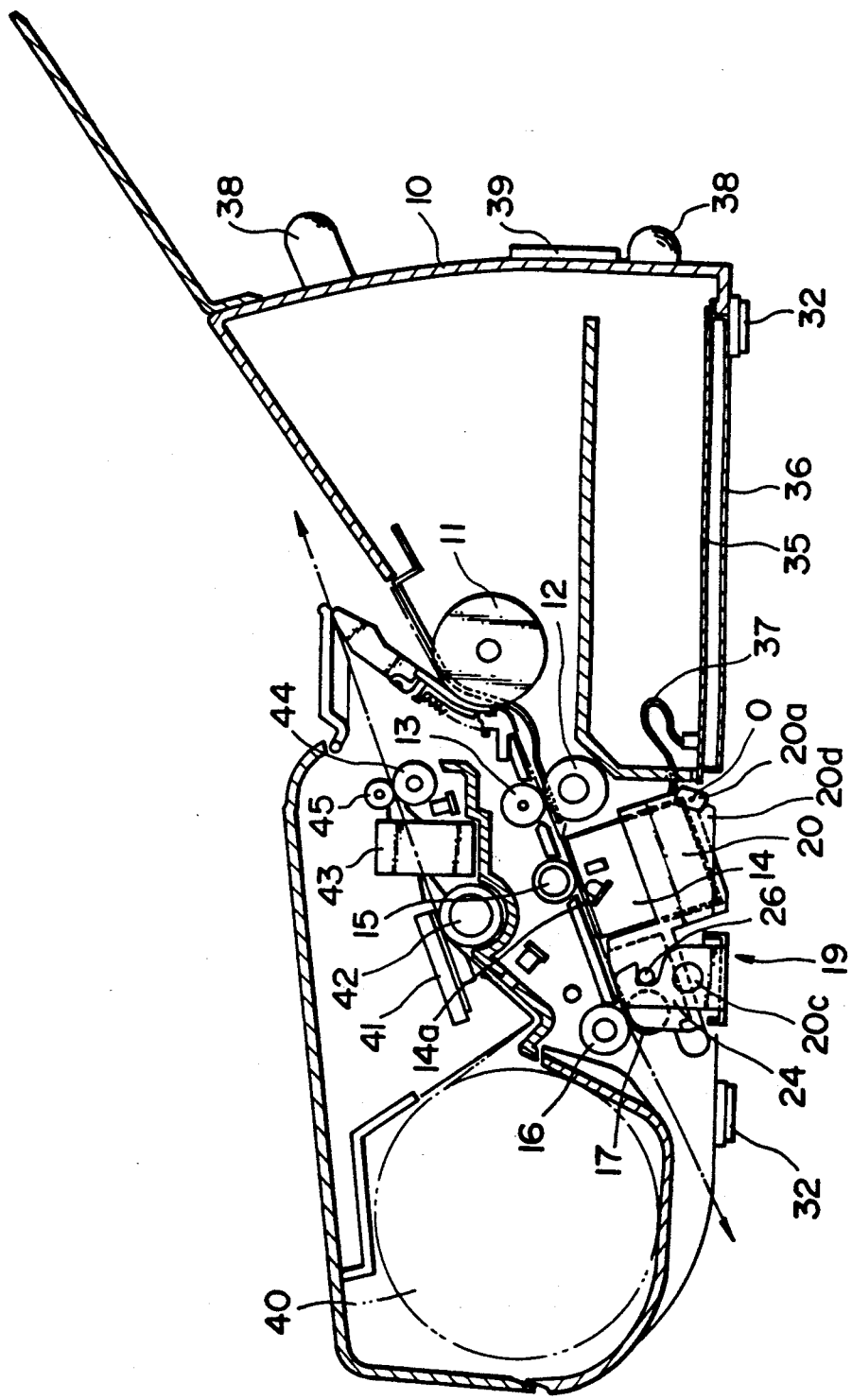
FIG. 1 is a schematic sectional view of an image reading device as a preferred embodiment of the present invention.

An image reading device according to the preferred embodiment of the invention will now be described with a descriptive emphasis on how easily the contact-type image sensor unit is maintained therein. Referring to FIG. 1, the image reading device comprises a body 10 for accommodating the transmitting and receiving sections of the device. The transmitting section comprises an introducing roller 11 for introducing each document into the device, a feed roller 12 for transporting the document, a feed pinch roller 13 that rotates freely in conjunction with the feed roller 12, a contact-type image sensor unit 14 having a glass portion 14a provided on its top, the unit being designed to read the document, a reading roller 15 for transporting the document while pushing it against the image sensor unit 14, an ejection roller 16 for ejecting the document out of the device, and an ejection pinch roller 17 that rotates freely in conjunction with the ejection roller 16.

A reading unit 19 integrally incorporates the image sensor 14, the ejection pinch roller 17 and other related parts. As shown magnified in FIGS. 2, 3 and 4, the reading unit 19 has a retaining member, i.e., a reading chassis 20 for retaining the image sensor unit 14. The image sensor unit 14 is fixedly mounted on a predetermined position of the reading chassis 20. A shaft 17a of the ejection pinch roller 17 is retained in a vertically movable manner. The reading chassis 20 has a rotary fulcrum shaft 20a attached to a bottom corner thereof, the shaft protruding at both ends of the chassis. Each end of the rotary fulcrum shaft 20a has two parallel planes 20b formed on the cylinder-shaped shaft. The rotary fulcrum shaft 20a is inserted into mounting recesses 22 for retention thereby, the recesses being formed on a chassis 21 fixed to the body. When the rotary fulcrum shaft 20a is inserted to support members 22a (described later in more detail) of the mounting recesses 22, the reading chassis 20 becomes rotatable around the central axis of the support members 22a, i.e., a putative rotary fulcrum axis 0—0. As shown in FIG. 1, the rotary fulcrum axis 0—0 determined by the support members 22a is located near the bottom of the body 10. This construction allows the reading chassis 20 to rotate around the rotary fulcrum axis 0—0 near the bottom of the body 10 from the closed position (where the document being transported in read by the image sensor unit 14 being retained) to the opened position indicated in FIG. 5 (where the image sensor 14 being retained extends out of the body 10).

Figure 2:
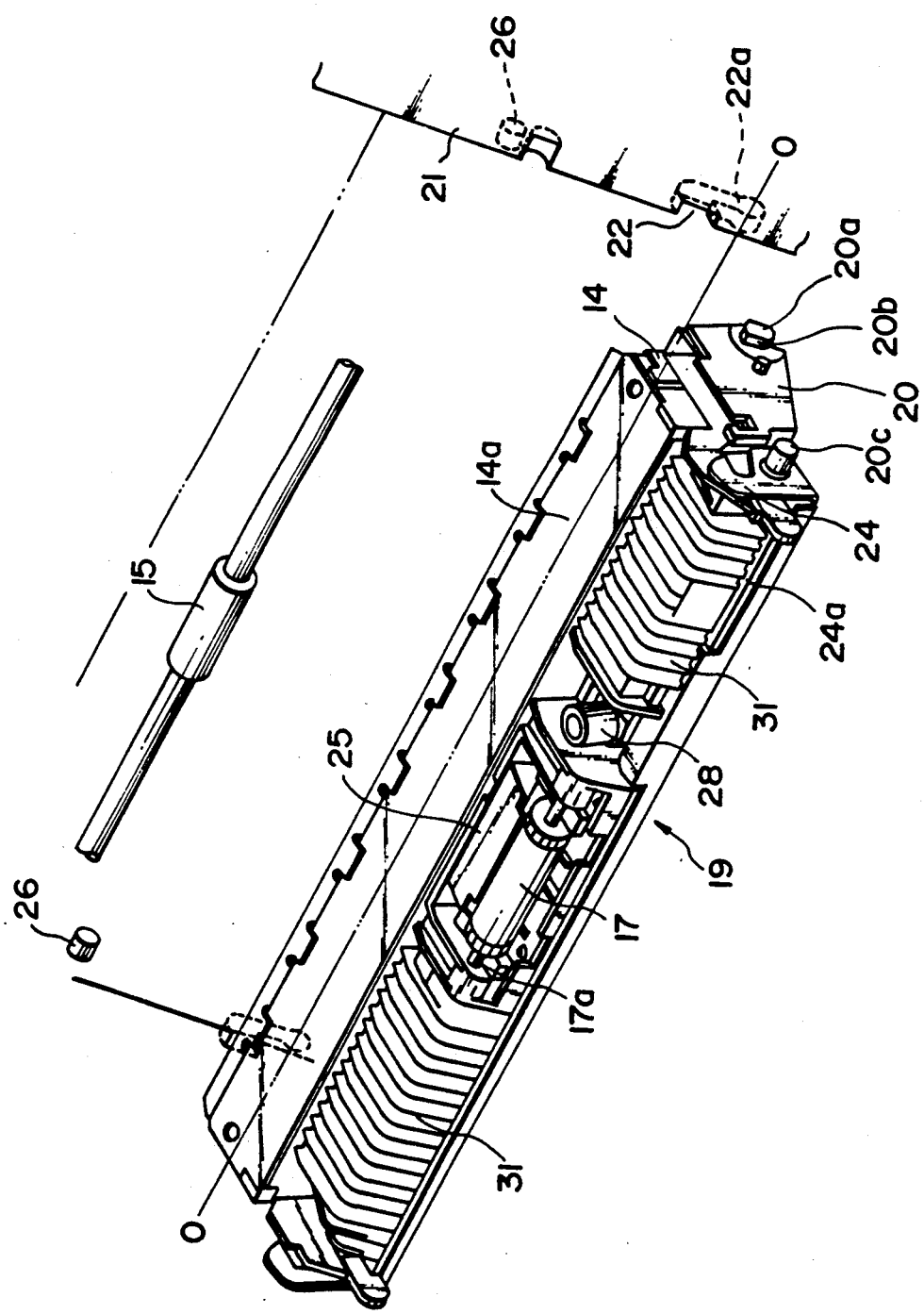
FIG. 2 is a schematic perspective view of a reading unit for use with the embodiment, the unit being shown as detached from the other parts of the embodiment.
Figure 3:
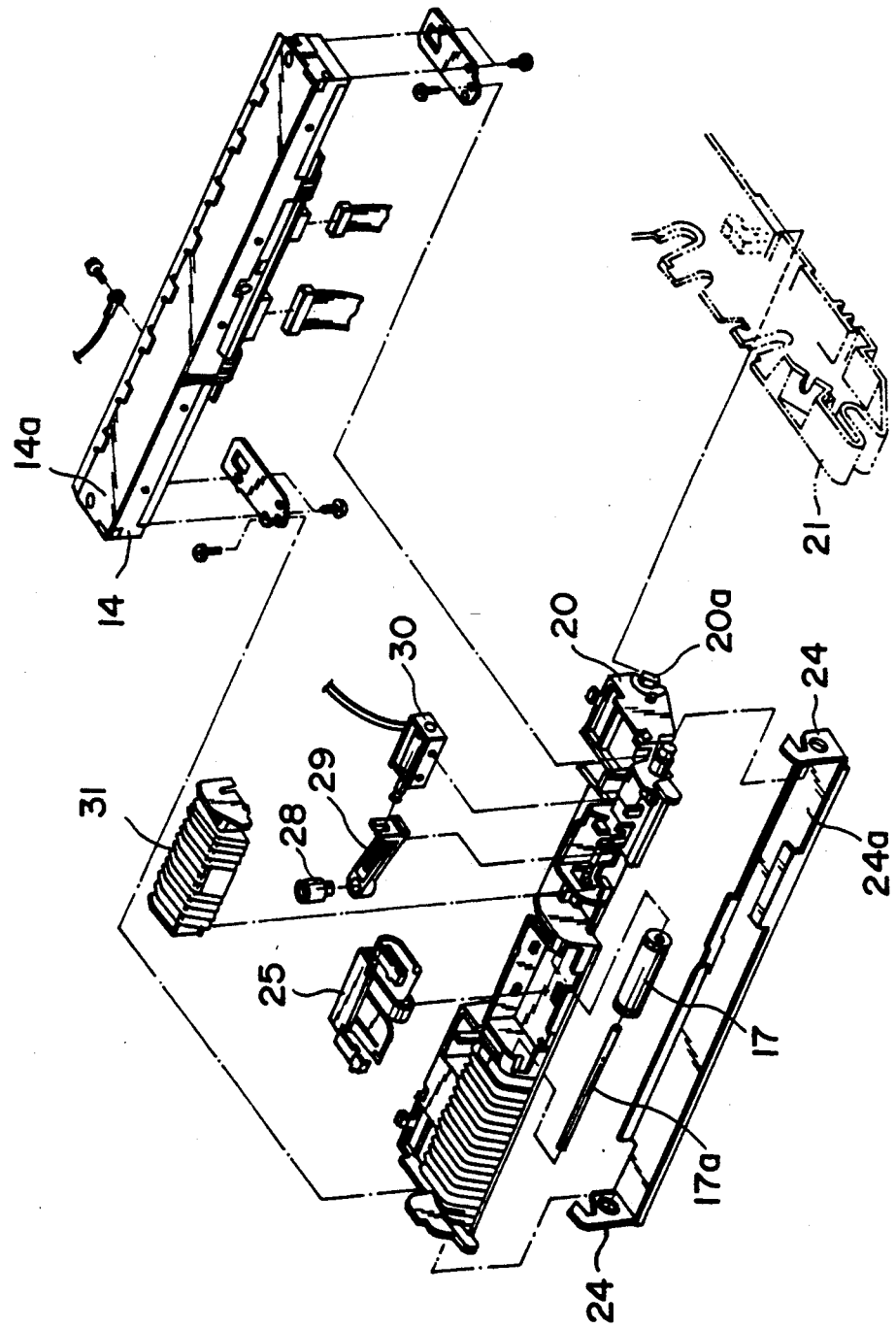
FIG. 3 is an exploded view of the reading unit.
Figure 4:
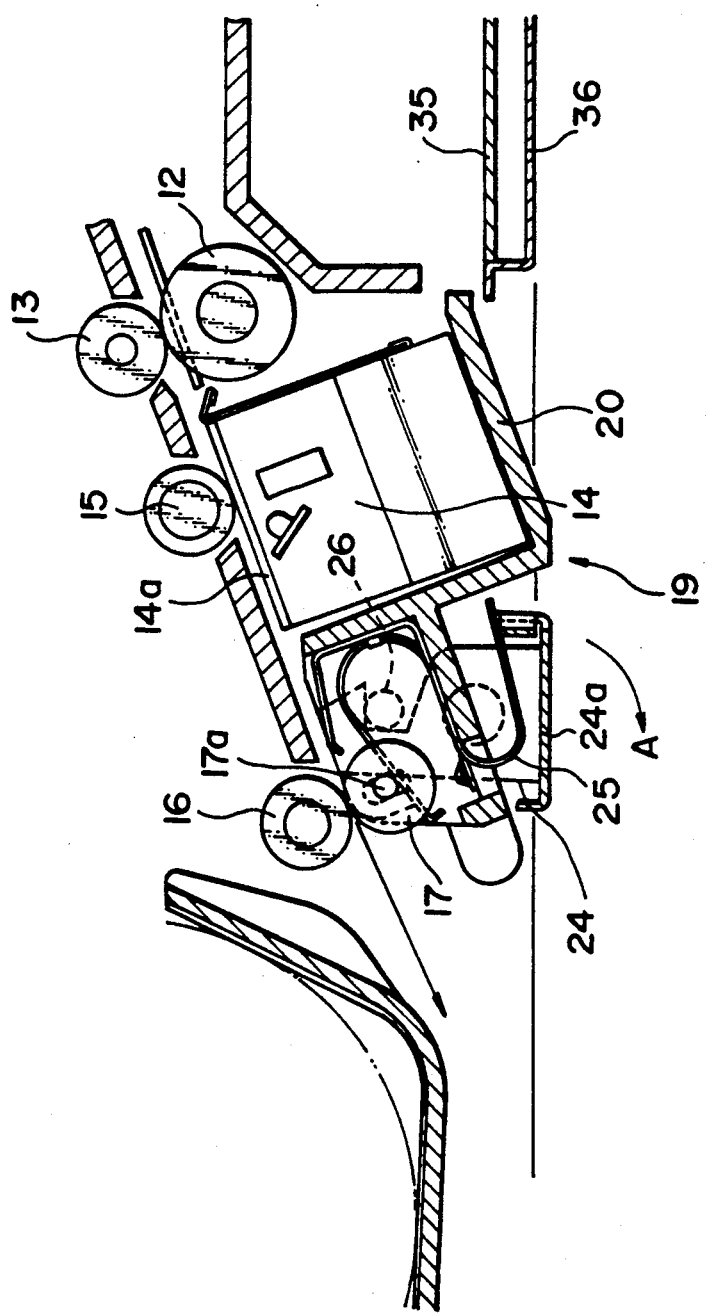
FIG. 4 is a sectional view of the reading unit in place and of the parts around the unit.

Referring to FIGS. 2, 3 and 4, the reading chassis 20 further comprises a latch shaft 20c protruding at both ends, the shaft being located away from the rotary fulcrum shaft 20a and in parallel therewith. A latch 24 is rotatably mounted on each end of the latch shaft 20c, the bottom ends of the latches being interconnected by latch bottom 24a. When the reading chassis 20 is closed, the latches 24 engage with latch pins 26 (see FIG. 1) provided on the chassis of the body to secure the reading chassis 20 in its closed position. The reading chassis 20 additionally comprises a plate spring 25 which is approximately S-shaped when seen laterally. As shown in FIG. 4, one end of the plate spring 25 pushes the shaft 17a of the ejection pinch roller 17 upward, the other end of the spring pushing downward against the right-hand end of the bottom 24a of the latches 24. Thus while the plate spring 25 is only a single member, it pushes the ejection pinch roller 17 against the ejection roller 16 while furnishing the latches 24 with a rotating torque whose direction is indicated by an arrow A, the latches thereby engaging the latch pins 26. The approximately S-shaped plate spring 25 actuates both the ejection pinch roller 17 and the latches 24. The ejection pinch roller shaft 17a and the latch bottom 24a keep the reading chassis 20 in place, with no need to use screws or the like for mounting purposes. This allows the device to be simple in construction, and the production thereof is made easier accordingly.

Referring to FIGS. 2 and 3, the reading chassis 20 has a stamp 28 for stamping a mark indicating that a document has been read, an arm 29 for securing the stamp 28, a solenoid 30 for operating the stamp 28, and a cover 31 which doubles as a document guide.

Figure 6:
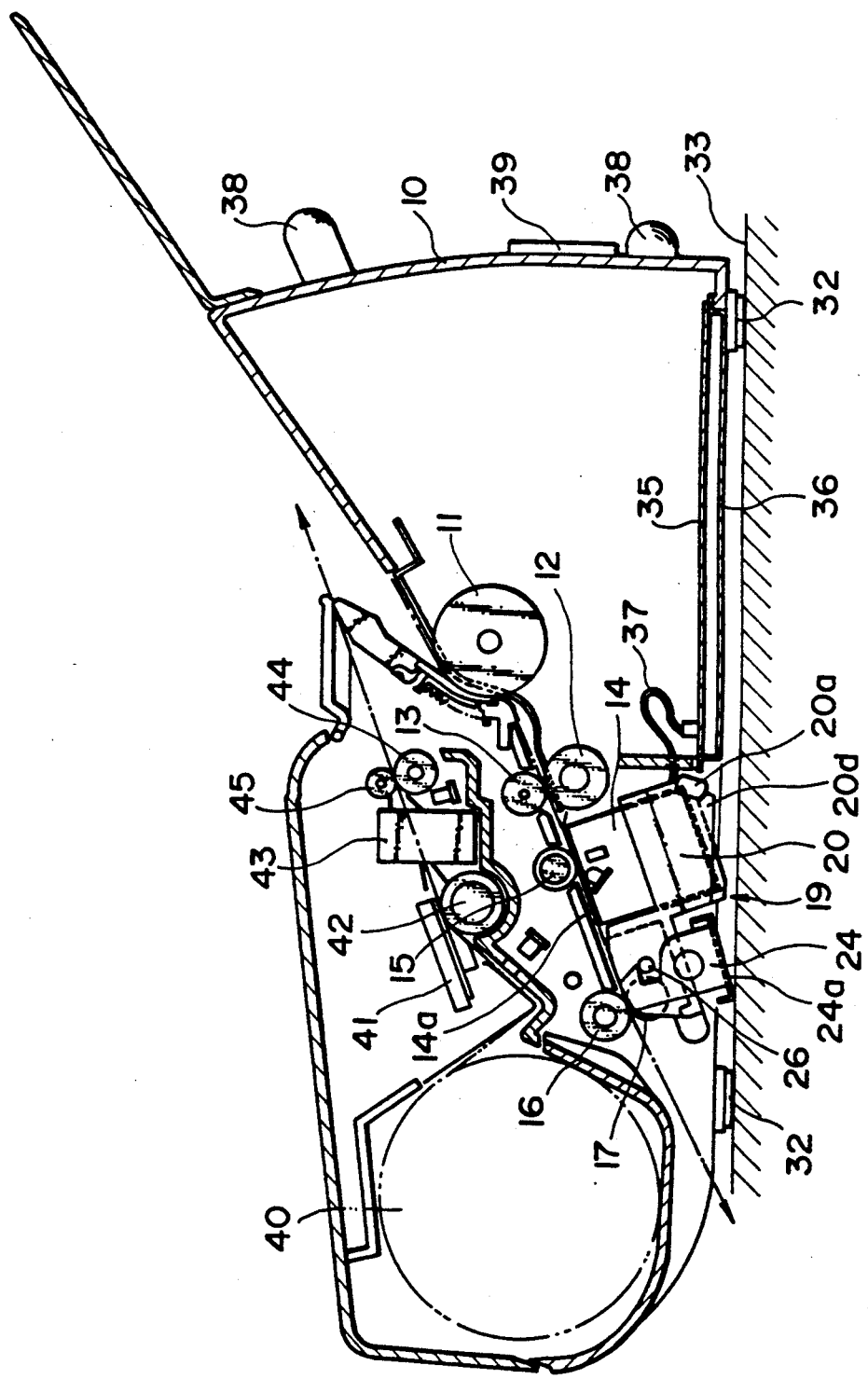
FIG. 6 is a schematic sectional view of the embodiment being placed on a plane, with the reading unit incompletely closed.

In FIG. 1, the bottom of the device body 10 comprises a plurality of projections, i.e., rubber legs 32 for supporting the body 10. Using the rubber legs 32, the device is placed on a plane. The reading unit 19, when properly closed, does not exceed the putative line connecting the tips of the rubber legs 32. If the reading unit 19 is not properly closed, with the latches 24 failing to engage securely with the latch pins 26, the bottoms 24a of the latches 24 protrude beyond the putative line connecting the tips of the rubber legs 32. Thanks to this construction, when the device is placed on a plane 33 as shown in FIG. 6, the bottoms 24a of the latches 24 hit the plane 33 and are pushed up thereby to have the latches 24 engaged normally or in a substantially normal manner. Thus even if the image sensor 14 is dislodged from its normal document reading position when the device is placed on a plane, the positioning error falls within tolerance and the reading takes place normally.

Referring again to FIG. 1, the device body 10 has a board 35 connected to the image sensor unit 14 via a harness 37 and a swingingly mounted cover member 36 for covering the area where the board 35 is located. At the right-hand end of the device body 10 is a terminal 39 for connection to a telephone set or the like, along with legs 38 protruding longer than the terminal 39. The legs 38 allow the device body 10 to be erected upright on this end for maintenance purposes without damaging the terminal 39. If the terminal 39 is incorporated inside the device, the legs 38 are not needed. In that case, one end of the device body 10 may be designed so that the device can be erected upright thereon.

Figure 5:
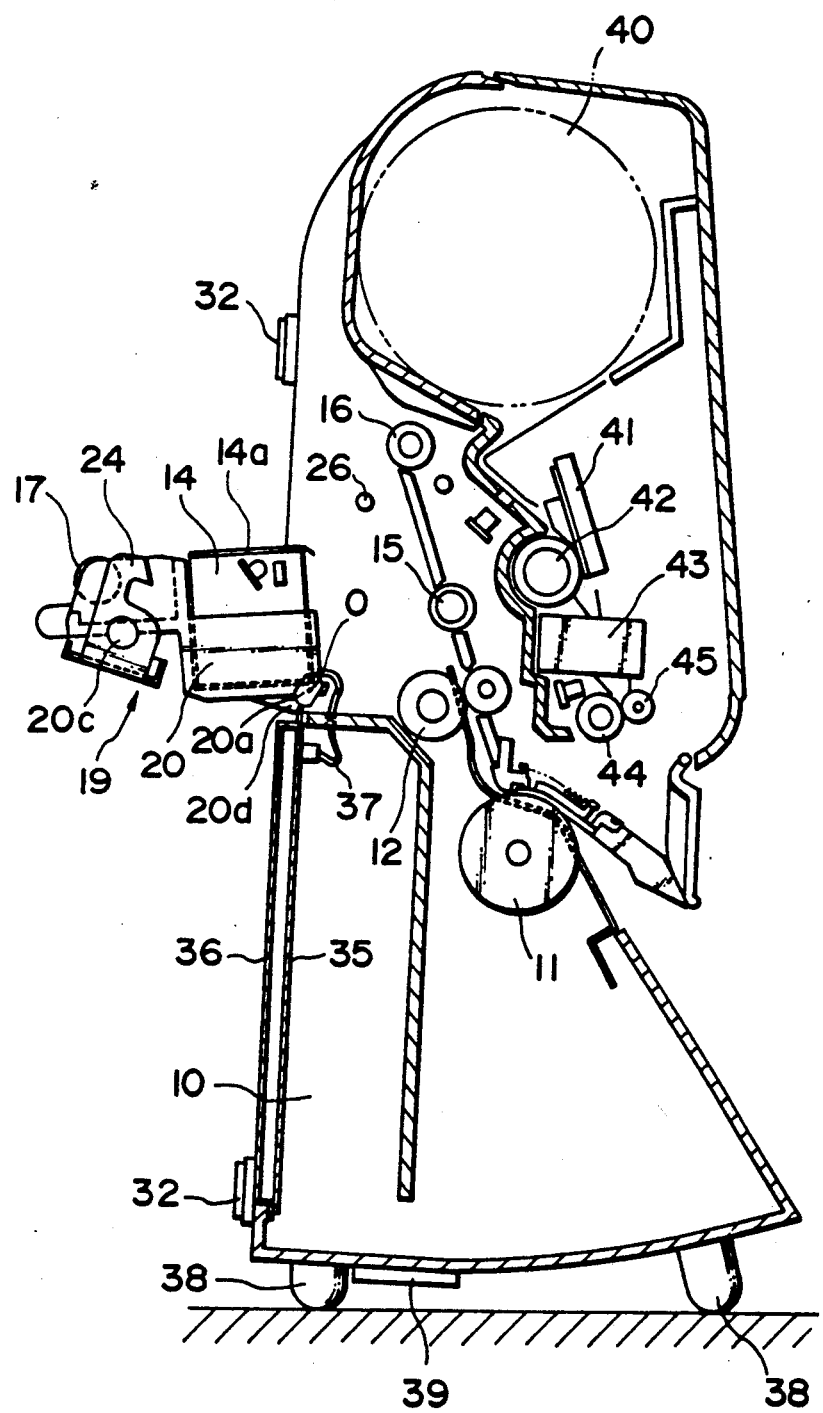
FIG. 5 is a schematic sectional view of the embodiment being erected upright on its side, with the reading unit opened from inside.
Figure 7A:
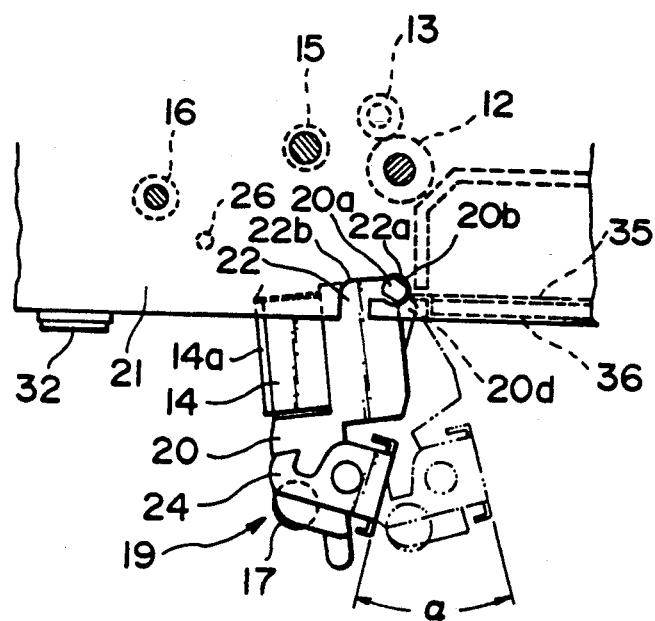
FIGS. 7A and 7B are schematic side views showing how the reading unit rotates.
Figure 7B:
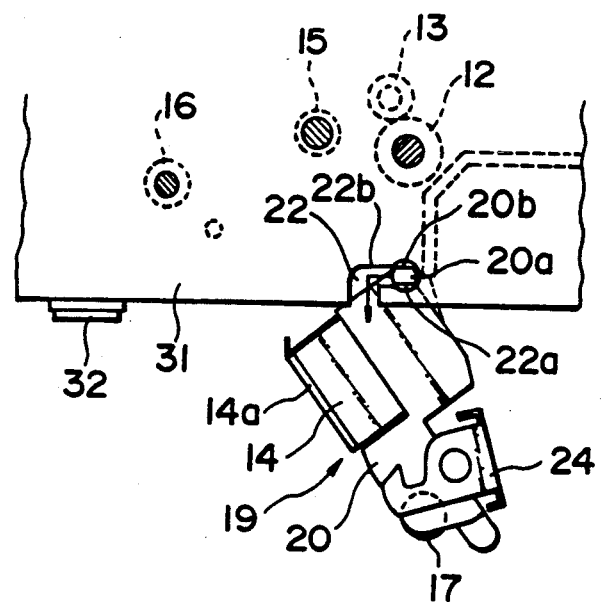

The cover member 36 doubles as a stopper for restricting the rotatable angle of the reading chassis 20. The bottom of the reading chassis 20 has a projection 20d. As illustrated in FIG. 5, when the reading chassis 20 is rotated around the rotary fulcrum shaft 20a, the projection 20d hits the cover member 36 and is stopped thereby. Thus when the cover member 36 is removed, the reading chassis 20 may be rotated further. FIGS. 7A and 7B depict how this occurs. FIG. 7A shows the chassis 20 being stopped in rotation by the cover member 36. With the cover member 36 removed, the reading chassis 20 may rotate by an additional angle α from the position indicated by solid line in FIG. 7A, to the position indicated in FIG. 7B. As mentioned earlier, the chassis 21 of the device body has the mounting recesses 22 into which to insert the rotary fulcrum shaft 20a of the reading chassis 20. The mounting recesses 22 comprise the support members 22a for rotatably supporting the rotary fulcrum shaft 20a and the guide portions 22a for letting pass therethrough the thinned parts of the shaft 22a. In the state of FIG. 7A, the planes 20b are not parallel to the guide portions 22b, thereby preventing the rotary fulcrum shaft 20a from passing through the guide portions 22b. When the reading chassis 20 rotates to the position shown in FIG. 7B, the rotary fulcrum shaft 20a may be detached from the support members 22a. Thus as long as the cover member 36 remains attached, the reading chassis 20 stays in place; there is no possibility of the chassis getting detached inadvertently from the device body.

In FIG. 1, the receiving section in the device body 10 comprises a recording paper roll 40, a thermal head 41 for printing onto the recording paper, a platen roller 42 for pushing the recording paper against the thermal head 41 and transporting the recorded paper, a cutter 43 for cutting off the recorded paper where appropriate, an ejection roller 44 for ejecting the recorded paper, and an ejection pinch roller 45 that rotates freely in conjunction with the ejection roller 44.

The construction of the image reading device according to the invention has been described so far. What follows is a description of how the device operates.

In ordinary operation, the reading chassis 20 is closed as shown in FIG. 1. The reading chassis 20 is fixed to this position by the latches 24 engaging with the latch pins 26. The image sensor unit 14 retained by the reading chassis 20 is secured in a suitable position under the document transport path. In this state, each document is introduced into the device by the introducing roller 11, forwarded by the feed roller 12, and pushed against the image sensor unit 14 by the reading roller 15 while being transported. The image sensor 14 reads the document being pushed and moved thereagainst and transmits the data that was read.

To replace or otherwise maintain the image sensor unit 14, the device body 10 is erected upright on the legs 38 at one end of the body. With the latches 24 detached from the latch pins 26, the reading chassis 20 is rotated around the rotary fulcrum shaft 20a. This allows the image sensor unit 14 to extend out of the device body 10 and be exposed for maintenance. Because the stamp 28 is also revealed at this time, it may also be maintained as required. In this manner, the image sensor unit 14 and the stamp 28 are readily revealed from inside the device body for easy maintenance. During maintenance work, the projections 20d of the reading chassis 20 abuts against the cover member 36 so that rotation of the chassis 20 is stopped thereby. Thus there is no possibility of the rotary fulcrum shaft 20a of the reading chassis 20 becoming inadvertently detached from its engaged position.

Figure 8:
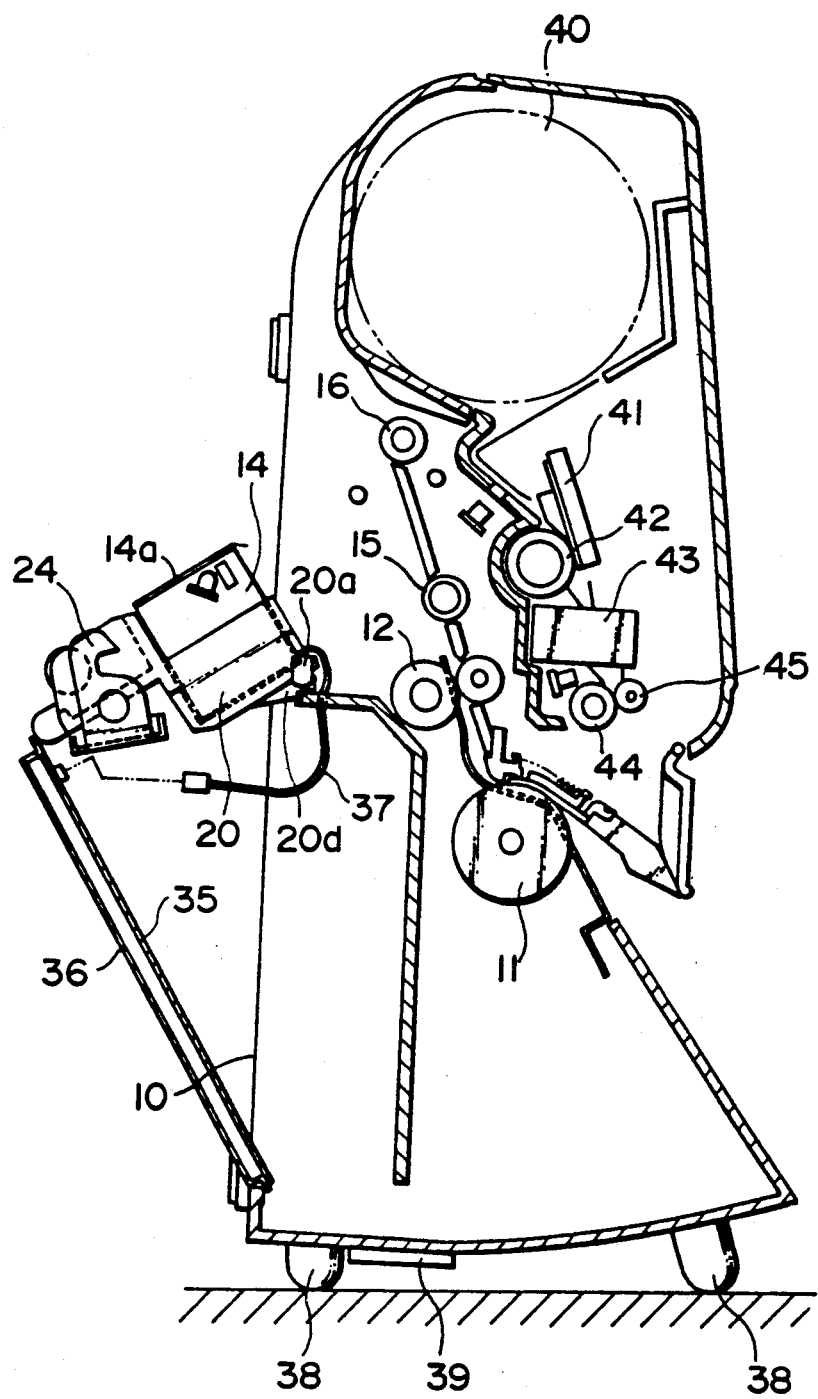
FIG. 8 is a schematic sectional view depicting how the reading unit is detached.

When it is necessary to remove the reading chassis 20, the cover member 36 is detached as shown in FIG. 8. This allows the reading chassis 20 to rotate from the position of FIG. 5 to the position of FIG. 7B. The state of FIG. 7B makes it possible to detach the rotary fulcrum shaft 20a through the guide portions 22b of the mounting recesses 22. For reassembly, the disassembling steps are reversed.

Upon completion of maintenance, the reading chassis 20 is rotated to its initial position (i.e., closed position), the latches 24 are engaged with the latch pins 26, and the device body 10 is placed on its legs 32 as depicted in FIG. 1. Even if the reading chassis 20 is not completely closed for some reason, placing the device body 10 on the plane 33 using the legs 32 causes the bottoms 24a of the latches 24 to be pushed up by the plane 33 so that the latches 24 are engaged normally or in a substantially normal manner. Thus even if the image sensor 14 is dislodged from its normal document reading position when the device is placed on the plane, the positioning error is within tolerance and the reading is carried out normally.

While the preferred embodiment of the invention has been described using specific terms, such description is for illustrative purposes only, and it is to be understood that changes and variations may be made without departing from the spirit or scope of the following claims.

What is claimed is:

1. An image reading device comprising:
   a device body;
   a document transport means which is provided within said device body and which transports original documents along a predetermined document transport path;
   an image sensor unit which is located under said document transport path so as to read each of the documents passing through said path;
   a retaining means for rotatably mounting said image sensor unit to said device body for rotation between a retracted position within said device body and an exposed position in which said image sensor unit extends through a bottom of said device body; and
   wherein said retaining means includes a retaining member comprising a rotary fulcrum shaft having substantially cylinder-shaped ends, each of said substantially cylinder-shaped ends of said rotary fulcrum shaft having a pair of planes parallel with each other, said device body including mounting recesses comprising support members for rotatably supporting said rotary fulcrum shaft adjacent said bottom of said device body and guide portions for letting said rotary fulcrum shaft pass therethrough, said guide portions having parts adjoining at least said support members, said parts being just large enough to let a thinned tip flanked by said parallel planes on each end of said rotary fulcrum shaft pass therebetween.

2. An image reading device according to claim 1, further comprising a stopper means for stopping said retaining member from rotating to a position where said member would become detachable, said detachable position being one in which the planes of said rotary fulcrum shaft are parallel to a center line of said guide portions of said mounting recesses.

3. An image reading device comprising:
   a device body;
   a document transport means which is provided within said device body and which transports original documents along a predetermined document transport path;
   an image sensor unit which is located under said document transport path so as to read each of the documents passing through said path;
   a retaining member rotatably mounting said image sensor unit to said device body for rotation relative to said device body, said retaining member comprising a rotary fulcrum shaft located adjacent to a bottom of said device body; and
   a cover member for swingingly covering a portion of said bottom of said device body near the position where said retaining member is located, said cover member including a means for restricting the rotational angle through which said image sensor unit can rotate when said cover member is fixedly mounted in place covering said portion of said bottom of said device body.

4. An image reading device according to claim 3, wherein
   said image sensor unit includes a projection thereon; and said restricting means comprises a portion of said cover member which abuts said projection when said image sensor unit is rotated by a predetermined rotational angle.

5. An image reading device comprising:

a device body;

a document transport means which is provided within said device body and which transports original documents along a predetermined document transport path;

an image sensor unit which is located under said document transport path so as to read each of the documents passing through said path;

a retaining member rotatably mounting said image sensor unit to said device body for rotation relative to said device body between a closed position and an exposed position, said retaining member comprising a rotary fulcrum shaft located adjacent to a bottom of said device body;

latch pins provided in predetermined position within said device body;

latches which are rotatably attached to said retaining member and which engage with said latch pins when said image sensor unit is in said closed position; and spring means for actuating said latches to engage with said latch pins.

6. An image reading device according to claim 5, further comprising a plurality of support projections provided on said bottom of said device body for support thereof, the bottoms of said latches protruding below a plane formed by the tips of said support projections when said image sensor unit is incompletely in said closed position.

7. An image reading device comprising:

a device body;

a document transport means which is provided within said device body and which transports original documents along a predetermined document transport path;

an image sensor unit which is located under said document transport path so as to read each of the documents passing through said path;

a retaining means for rotatably mounting said image sensor unit to said device body for rotation between a retracted position within said device body and an exposed position in which said image sensor unit extends through a bottom of said device body;

wherein said retaining is operable to allow release of said image sensor unit from said device body only when said sensor unit is rotated to a predetermined detachable position; and wherein a stopper means is provided for preventing said sensor unit from being rotated to said predetermined detachable position.

8. An image reading device comprising:

a device body;

a document transport means which is provided within said device body and which transports original documents along a predetermined document transport path;

an image sensor unit which is located under said document transport path so as to read each of the documents passing through said path;

a retaining means for rotatably mounting said image sensor unit to said device body for rotation between a retracted position within said device body and an exposed position in which said image sensor unit extends through a bottom of said device body;

wherein, during use, said bottom of said device body is disposed substantially horizontally and an end of said device body is disposed approximately vertically; and wherein support means are provided for supporting said device body such that said end of said device body is disposed approximately horizontally and said bottom of said device body is disposed substantially vertically in order to allow access to said image sensor unit, said support means comprising a plurality of legs projecting from said end of said device body.

9. An image reading device according to any one of claims 2, 3, 4, 6, 7, and 13, further comprising a support means located at one end of said device body for allowing said device body to be erected upright with said one end facing below.

* * * * *